(12) United States Patent
Lim

(10) Patent No.: US 12,483,755 B2
(45) Date of Patent: Nov. 25, 2025

(54) MMT BASED DRM OPERATION FOR ATSC 3.0

(71) Applicant: Samsung Electronics Co., Ltd., Suwon-si (KR)

(72) Inventor: Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 17/735,908

(22) Filed: May 3, 2022

(65) Prior Publication Data

US 2022/0360853 A1    Nov. 10, 2022

Related U.S. Application Data

(60) Provisional application No. 63/318,642, filed on Mar. 10, 2022, provisional application No. 63/276,323, (Continued)

(51) Int. Cl.
*H04N 21/4627* (2011.01)
*H04N 21/4623* (2011.01)
(Continued)

(52) U.S. Cl.
CPC ..... *H04N 21/4627* (2013.01); *H04N 21/4623* (2013.01); *H04N 21/8352* (2013.01); *H04N 21/84* (2013.01)

(58) Field of Classification Search
CPC ........... H04N 21/4627; H04N 21/4623; H04N 21/8352; H04N 21/84
See application file for complete search history.

(56) References Cited

U.S. PATENT DOCUMENTS 8,755,524 B2    6/2014   Shin et al.
10,743,069 B2   8/2020   Hearty et al.
(Continued)

FOREIGN PATENT DOCUMENTS

EP    2160899 B1 *  5/2019  ............ G11B 27/10
JP    2019110569 A   7/2019
(Continued)

OTHER PUBLICATIONS

International Search Report and Written Opinion issued Aug. 19, 2022 regarding International Application No. PCT/KR2022/006422, 9 pages.

*Primary Examiner* — Pinkal R Chokshi

(57) ABSTRACT

A decoding device includes a communication interface and a processor operably coupled to the communication interface. The communication interface receives at least a portion of a broadcast stream including media data, which includes media samples. The processor identifies information elements containing DRM processing information in the broadcast stream. Each information element is associated with a respective one media sample of the media data. For each information element, the processor also identifies the one media sample that is associated with the information element. The processor further identifies, based on the information element, the DRM processing information for the one media sample. In addition, the processor decodes the one media sample based on the DRM processing information.

16 Claims, 11 Drawing Sheets

Related U.S. Application Data filed on Nov. 5, 2021, provisional application No. 63/238,488, filed on Aug. 30, 2021, provisional application No. 63/228,477, filed on Aug. 2, 2021, provisional application No. 63/223,873, filed on Jul. 20, 2021, provisional application No. 63/184,565, filed on May 5, 2021.

(51) Int. Cl.
*H04N 21/8352* (2011.01)
*H04N 21/84* (2011.01)

(56) References Cited

U.S. PATENT DOCUMENTS

| | | | |
|---|---|---|---|
| 2007/0130498 A1* | 6/2007 | Hannuksela | G11B 27/005 |
| | | | 348/E5.007 |
| 2014/0020111 A1 | 1/2014 | Wang et al. | |
| 2014/0149545 A1* | 5/2014 | Bouazizi | H04L 65/612 |
| | | | 709/217 |
| 2014/0317668 A1* | 10/2014 | Zhang | H04N 21/6587 |
| | | | 725/116 |
| 2016/0293213 A1* | 10/2016 | Kim | H04N 21/23614 |
| 2016/0364551 A1* | 12/2016 | Bouazizi | H04N 21/63345 |
| 2018/0026733 A1* | 1/2018 | Yang | H04N 21/235 |
| | | | 725/33 |
| 2018/0373847 A1* | 12/2018 | Lo | H04N 21/4627 |
| 2019/0058909 A1* | 2/2019 | Eyer | H04N 21/4627 |
| 2019/0166392 A1 | 5/2019 | Eyer | |
| 2019/0372602 A1* | 12/2019 | Park | H04L 1/0058 |
| 2021/0099744 A1 | 4/2021 | Eyer et al. | |
| 2021/0105492 A1* | 4/2021 | Aksu | H04N 21/2362 |
| 2022/0109897 A1* | 4/2022 | Iguchi | H04N 21/85406 |

FOREIGN PATENT DOCUMENTS

| | | |
|---|---|---|
| KR | 10-1244308 B1 | 3/2013 |
| KR | 10-2020-0036870 A | 4/2020 |
| KR | 10-2020-0093541 A | 8/2020 |

* cited by examiner

MMT BASED DRM OPERATION FOR ATSC 3.0

CROSS-REFERENCE TO RELATED APPLICATION AND PRIORITY CLAIM

This application claims priority under 35 U.S.C. § 119(e) to U.S. Provisional Patent Application No. 63/184,565 filed on May 5, 2021, U.S. Provisional Patent Application No. 63/223,873 filed on Jul. 20, 2021, U.S. Provisional Patent Application No. 63/228,477 filed on Aug. 2, 2021, U.S. Provisional Patent Application No. 63/238,488 filed on Aug. 30, 2021, U.S. Provisional Patent Application No. 63/276,323 filed on Nov. 5, 2021, U.S. Provisional Patent Application No. 63/318,642 filed on Mar. 10, 2022, which are hereby incorporated by reference in its entirety.

TECHNICAL FIELD

This disclosure relates generally to broadcasting devices and processes. More specifically, this disclosure relates to Moving Picture Experts Group (MPEG) Media Transport (MMT) based digital rights management (DRM) operation for Advanced Television Systems Committee, Inc. (ATSC) 3.0.

BACKGROUND

ATSC 3.0 broadcast equipment and receivers are being implemented through the world. An ATSC 3.0 is being launched soon in the United States. Major cellular equipment manufacturers are now implementing ATSC 3.0 client in new electronic devices.

SUMMARY

This disclosure provides an MMT based DRM operation for ASTC 3.0.

In a first embodiment, a decoding device includes a communication interface and a processor operably coupled to the communication interface. The communication interface receives at least a portion of a broadcast stream including media data comprising media samples. The processor identifies information elements containing digital rights management (DRM) processing information in the broadcast stream, where each information element is associated with a respective one media sample of the media data. For each information element, the processor also identifies the one media sample that is associated with the information element. The processor further identifies, based on the information element, the DRM processing information for the one media sample. In addition, the processor decodes the one media sample based on the DRM processing information.

In a second embodiment, a method includes receiving, using a communication interface of the decoding device, at least a portion of a broadcast stream including media data comprising media samples. The method also includes identifying, using a processor of the decoding device operably coupled to the communication interface, information elements containing digital rights management (DRM) processing information in the broadcast stream, wherein each information element is associated with a respective one media sample of the media data. For each information element, the method further includes identifying, using the processor, the one media sample that is associated with the information element. The method additionally includes identifying, based on the information element, the DRM processing information for the one media sample. The method further includes decoding, using the processor, the one media sample based on the DRM processing information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Figure 1:
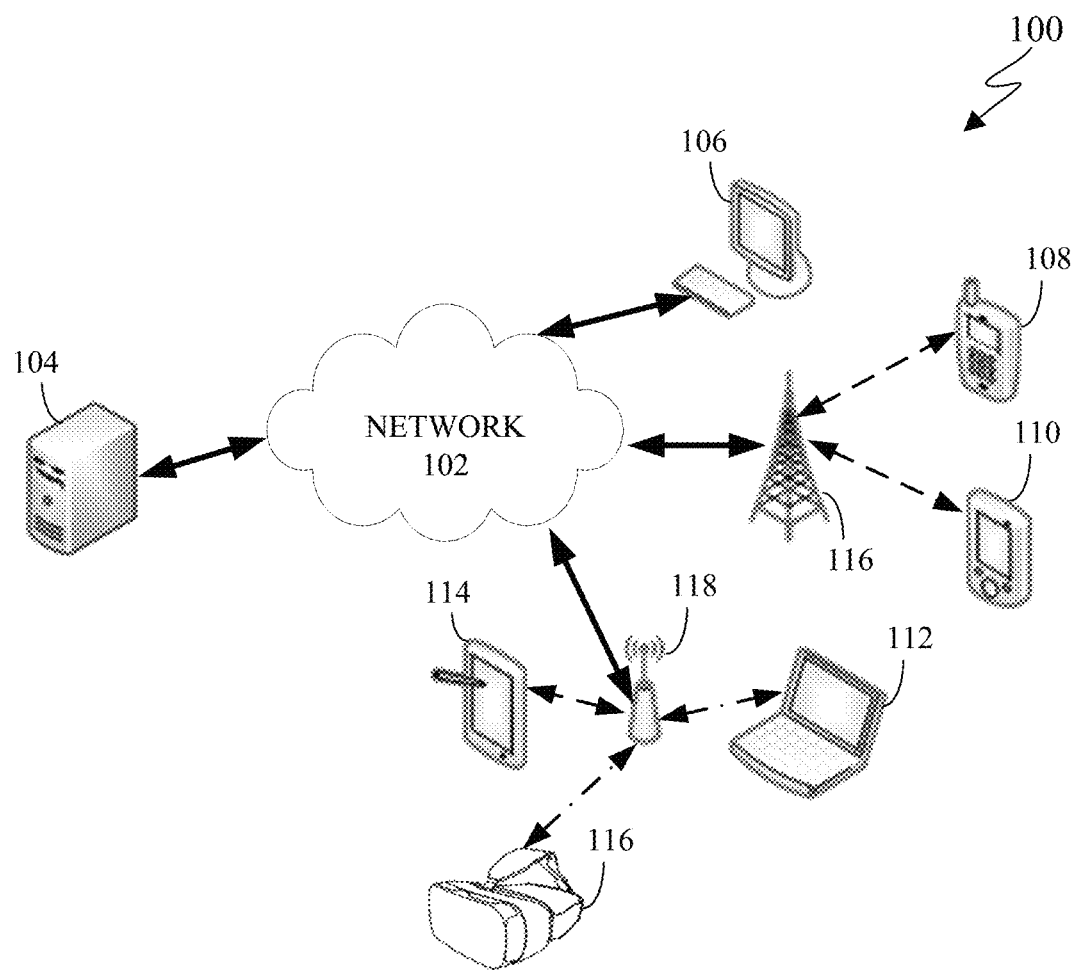
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-116 can include an encoder, decoder, or both. For example, the mobile device 108 can record a video and then encode the video enabling the video to be transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress media data, generate a bitstream that represents the media data, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a media data, compress media data, transmit media data, receive media data, render media data, or a combination thereof. For example, the server 104 can then compress media data to generate a bitstream and then transmit the bitstream to one or more of the client devices 106-116. For another example, one of the client devices 106-116 can compress media data to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
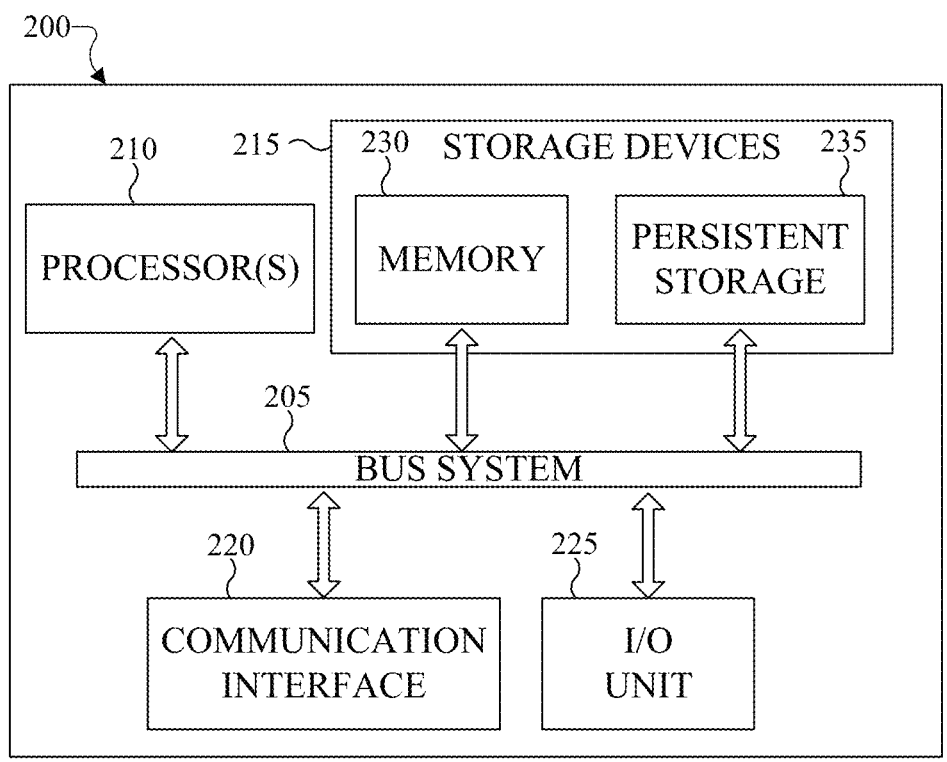
FIGS. 2 and 3 illustrate example electronic devices in accordance with an embodiment of this disclosure.
Figure 3:
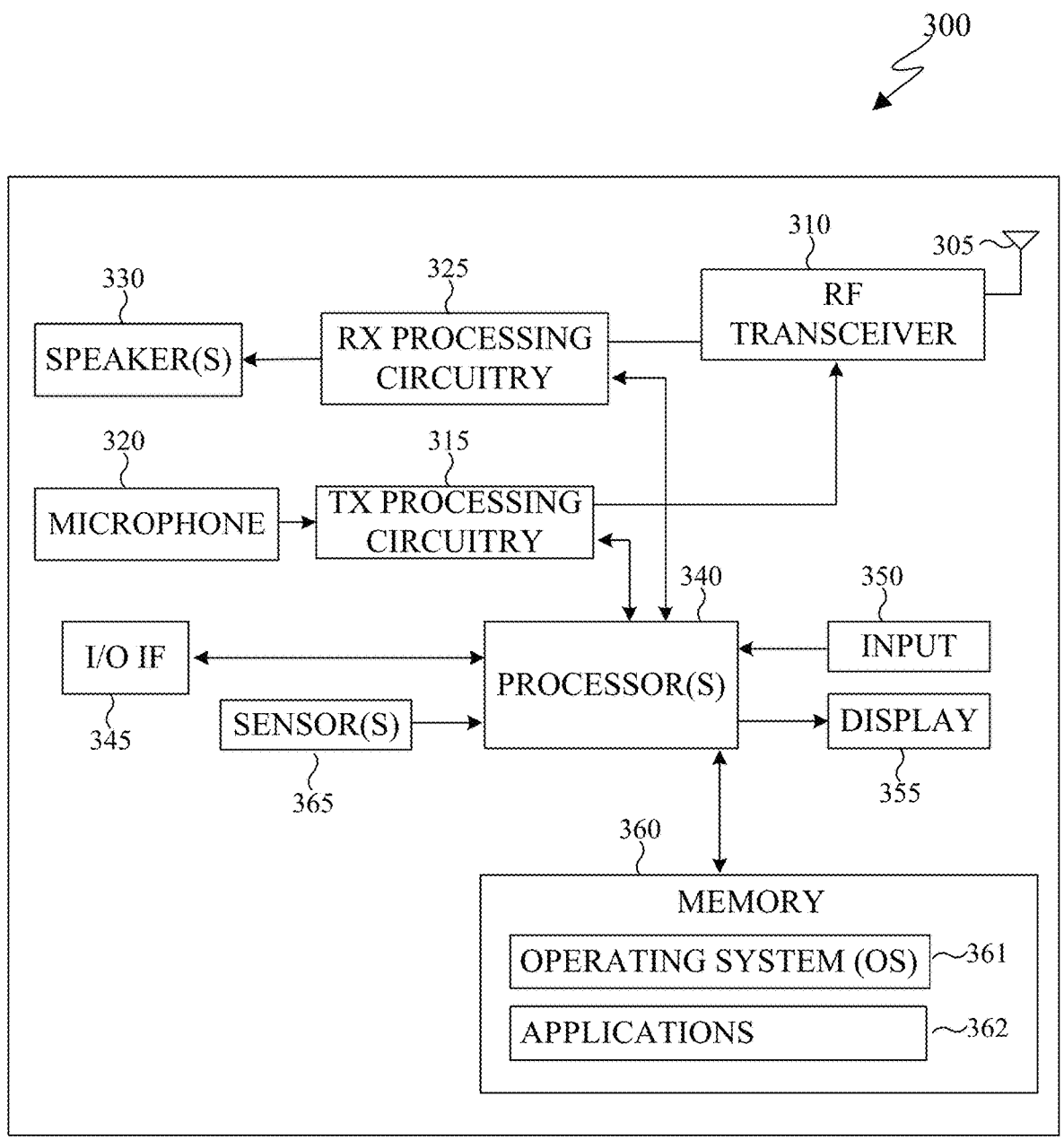

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communications interface 220, and at least one input/output (I/O) unit 225. The server 200 can represent one or more local servers, one or more compression servers, or one or more encoding servers, such as an encoder. In certain embodiments, the encoder can perform decoding.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a media data stored within the storage devices 215.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing media data to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
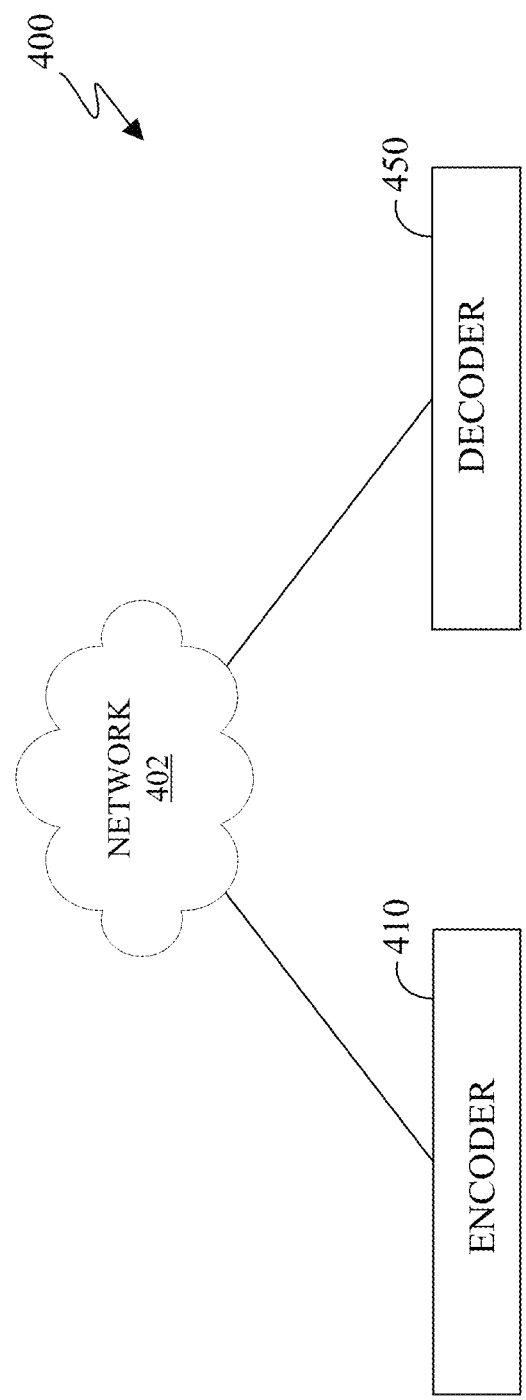
FIG. 4 illustrates a block diagram of an example environment-architecture for MMT based DRM operation for ATSC 3.0 in accordance with an embodiment of this disclosure.

FIG. 4 illustrates a block diagram of an example environment-architecture 400 for an MMT based DRM operation for ATSC 3.0 in accordance with an embodiment of this disclosure. The embodiment of FIG. 4 is for illustration only. Other embodiments can be used without departing from the scope of this disclosure.

As shown in FIG. 4, the example environment-architecture 400 includes an encoder 410 and a decoder 450 in communication over a network 402. The network 402 can be the same as or similar to the network 102 of FIG. 1. In certain embodiments, the network 402 represents a "cloud" of computers interconnected by one or more networks, where the network is a computing system utilizing clustered computers and components that act as a single pool of seamless resources when accessed. Also, in certain embodiments, the network 402 is connected with one or more servers (such as the server 104 of FIG. 1, the server 200), one or more electronic devices (such as the client devices 106-116 of FIG. 1, the electronic device 300), the encoder 410, and the decoder 450. Further, in certain embodiments, the network 402 can be connected to an information repository (not shown) that contains media content that can be encoded by the encoder 410, decoded by the decoder 450, or rendered and displayed on an electronic device.

In certain embodiments, the encoder 410 and the decoder 450 can represent the server 104, one of the client devices 106-116 of FIG. 1, or another suitable device. The encoder 410 and the decoder 450 can include internal components similar to the server 200 of FIG. 2 and electronic device 300 of FIG. 3. In certain embodiments, the encoder 410 and the decoder 450 can be a "cloud" of computers interconnected by one or more networks, where each is a computing system utilizing clustered computers and components to act as a single pool of seamless resources when accessed through the network 402. In some embodiments, a portion of the components included in the encoder 410 or the decoder 450 can be included in different devices, such as multiple servers 104 or 200, multiple client devices 106-116, or other combination of different devices. In certain embodiments, the encoder 410 is operably connected to an electronic device or a server while the decoder 450 is operably connected to an electronic device. In certain embodiments, the encoder 410 and the decoder 450 are the same device or operably connected to the same device.

The decoder 450 can include a communication interface and a processor operably coupled to the communication interface. The communication interface receives at least a portion of a broadcast stream including media data comprising media samples. The processor identifies information elements containing digital rights management (DRM) processing information in the broadcast stream, where each information element is associated with a respective one media sample of the media data. For each information element, the processor also identifies the one media sample that is associated with the information element. The processor further identifies, based on the information element, the DRM processing information for the one media sample. In addition, the processor decodes the one media sample based on the DRM processing information.

Although FIG. 4 illustrates examples of an encoder and a decoder, various changes can be made to FIG. 4. For example, various components in FIG. 4 could be combined, further subdivided, or omitted and additional components could be added according to particular needs. As a particular example, the encoder 410 or decoder 450 could be divided into multiple components. In addition, as with computing and communication, encoders and decoders can come in a wide variety of configurations, and FIG. 4 does not limit this disclosure to any particular encoder or decoder.

Figure 5:
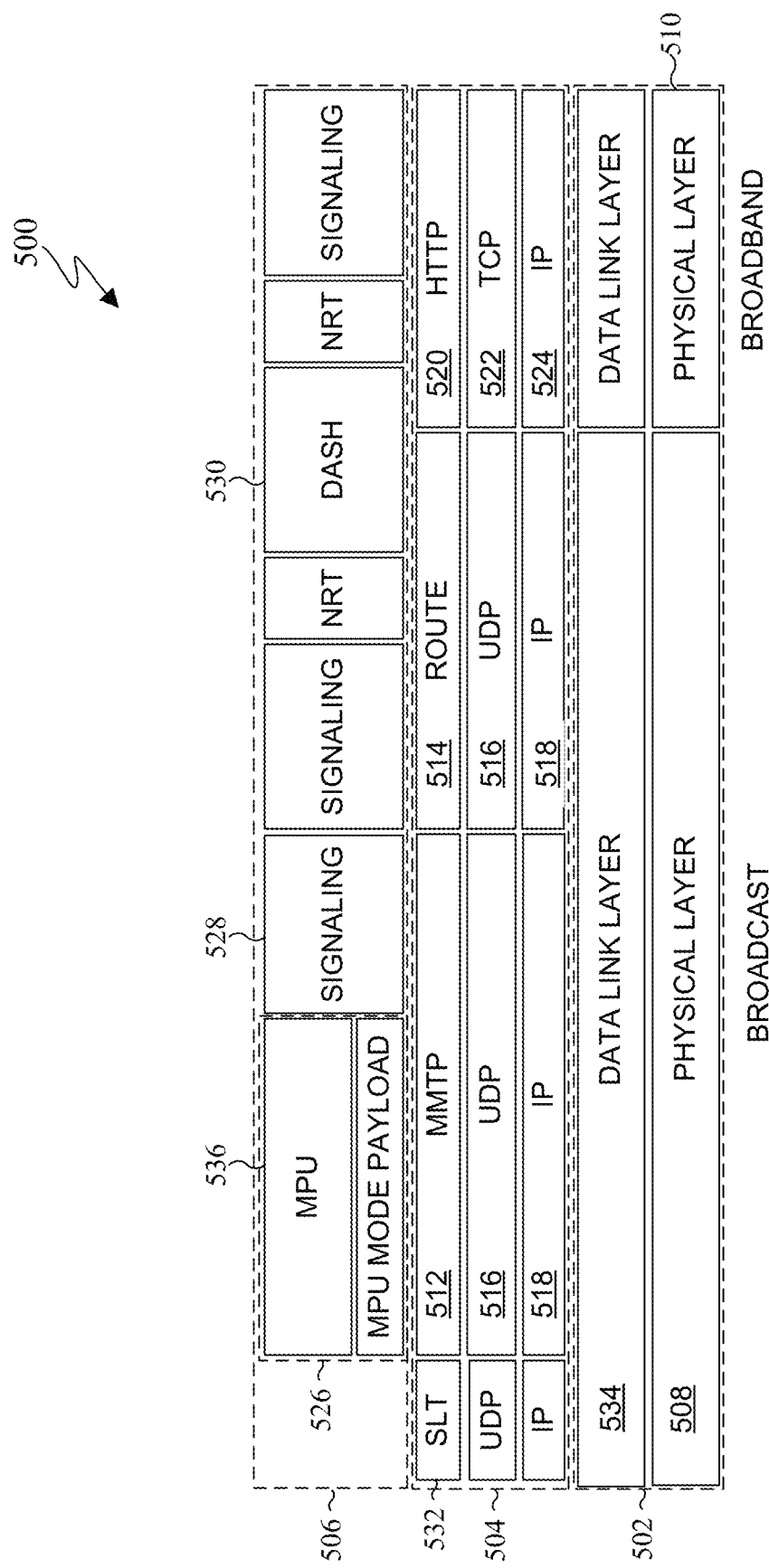
FIG. 5 is a diagram illustrating a hierarchical structure of an ATSC 3.0 receiver protocol stack according to an exemplary embodiment.

FIG. 5 is a diagram illustrating a hierarchical structure of an ATSC 3.0 receiver protocol stack 500 according to an exemplary embodiment. ATSC 3.0 services can be delivered using three functional layers, which includes a physical layer 502, a delivery layer 504, and a service management layer 506. The physical layer 502 can provide mechanisms by which signaling, service announcement and IP packet streams are transported over the broadcast physical layer 508 and/or broadband physical layer 510. The delivery layer 504 provides object and object flow transport functionality, which is enabled by the MPEG Media Transport Protocol (MMTP) 512 or the Real-Time Object Delivery over Unidirectional Transport (ROUTE) protocol 514, operating on a UDP 516/IP 518 multicast over the broadcast physical layer 508, and enabled by the HTTP protocol 520 on a TCP 522/IP 524 unicast over the broadband physical layer 510. The service management layer 506 primarily supports the means for service discovery and acquisition to enable different types of services, such as linear TV and/or HTML5 application Service, to be carried by the underlying delivery and physical layers 502.

Referring to FIG. 5, a service includes media data 526 and signaling 528 for transferring information required to acquire and consume the media data 526 at a receiver. The media data 526 may be encapsulated in a format suitable for transmission prior to the transmission. An encapsulation method may follow a media processor unit (MPU) 530 defined in ISO/IEC 23008-1 MPEG Media Transport (MMT) or a DASH segment format defined in ISO/IEC 23009-1 Dynamic Adaptive Streaming over HTTP (DASH) 530. The media data 526 and the signaling 528 are packetized according to an application layer protocol.

FIG. 5 illustrates a case in which an MMT protocol (MMTP) 512 defined in the MMT and a Real-Time Object Delivery over Unidirectional Transport (ROUTE) protocol 514 are used as the application layer protocol. In this case, a method for notifying information about an application protocol, in which a service is transmitted, by an independent method different from the application layer protocol is required for the receiver to know by which application layer protocol the service is transmitted.

A service list table (SLT) 532 illustrated in FIG. 5 represents or indicates a signaling method and packetizes information about the service in a table for satisfying the aforementioned object. The packetized media data and the signaling including the SLT 532 are transferred to a broadcasting link layer 534 through a user datagram protocol (UDP) 516 and an Internet protocol (IP) 518. An example of the broadcasting link layer 534 includes an ATSC 3.0 link-layer protocol (ALP) defined in the ATSC 3.0 standard (hereafter, referred to as 'ATSC 3.0'). The ALP protocol generates an ALP packet by using an IP packet as an input and transfers the ALP packet to a broadcasting physical layer 508.

The broadcast physical layer 508 can generate a physical layer frame by signal-processing the ALP packet as the input, converts the physical layer frame into a radio signal, and transmits the radio signal. In this case, the broadcasting physical layer 508 has at least one signal processing path. An example of the signal processing path may include a physical layer pipe (PLP) of ATSC 3.0 or the Digital Video Broadcasting-Second Generation Terrestrial (DVB-T2) standard, and one or more services or some of the services may be mapped to the PLP.

Figure 6:
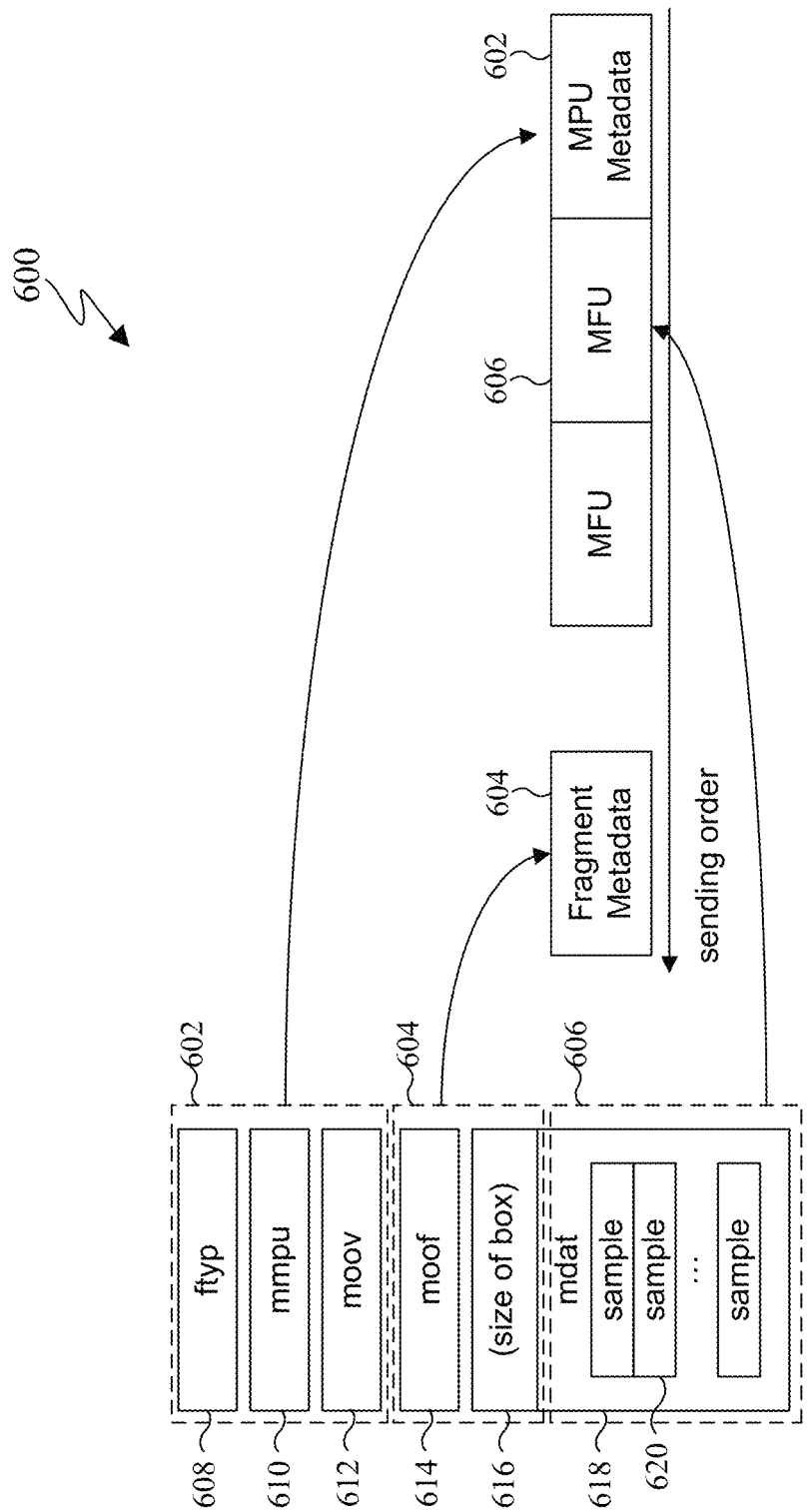
FIG. 6 illustrates an exemplary diagram of packetization of timed media data transmitted in an "out-of-order" mode according to this disclosure.

FIG. 6 illustrates an exemplary diagram of packetization of timed media data transmitted in an "out-of-order" mode 600 in accordance with various embodiments of the present disclosure. The packetization of an MPU that contains timed media may be performed in an MPU format-aware and/or MPU format agnostic mode. In the MPU format agnostic mode, the MPU is packetized into data units of equal size (except for the last data unit, of which the size may differ) or a predefined size according to the size of MPU of the underlying delivery network by using generic file delivery (GFD). In other words, the packetization of the MPU format agnostic mode may only consider the size of data to be carried in the packet. The type field for the MMTP packet header is set to 0x00 to indicate that the packetization is format agnostic mode.

In the MPU format-aware mode, the packetization procedure considers the boundaries of different types of data in MPU to generate packets by using MPU mode. The resulting packets carry delivery data units of either MPU metadata 602, movie fragment metadata 604, or a move fragment unit (MFU) 606. The resulting packets may not carry more than two different types of delivery data units. The delivery data unit of MPU metadata is assigned the DU_type 0x01. The MPU metadata includes a file type box (ftyp) 608, an MMT processing unit (mmpu) box 610, the movie box (moov) 612, and any other boxes that are applied to the whole MPU. The delivery data unit of movie fragment metadata 604 consists of the movie fragment box (moof) 614 and a movie data box (mdat) header 616 (excluding any media data) and is assigned the DU_type 0x02. The media data, MFUs 606 in mdat 618 of MPU, is then split into multiple delivery data units 620 of MFU in a format aware way. This may, for example, be performed with the help of the MMT hint track. The MFU may include 1) only media data, 2) media data with a sequence number, and 3) media data with some control information. Each MFU is prepended the MFU header, which has the syntax and semantics. The MFU header is followed by the media data of the MFU.

Low latency signaling and delivery of digital right management (DRM) signaling information has not been defined, including an out-of-order delivery mode 600 delivery of MMT enabling low latency delivery media and DRM information signaling and delivery for out-of-order delivery mode 600. For the out-of-order delivery mode 600, video data is stored in the mdat 618 and metadata (e.g. timing data) is stored in the moof 614. The data in the moof 614 cannot be fully constructed before the mdat 618 is completed.

The out-of-order delivery mode 600 allows for independent delivery of mdat data units 620 upon creation of a specific mdat data unit 620 and the delivery of the metadata in the moof 614 after all mdat data units 620 are delivered. In certain embodiment, the moof 614 can be transmitted any time after completion of the moof 614 regardless of amount of mdat data units 620 already transmitted or remain to be transmitted as long as at least one single mdat data unit 620 is transferred prior to the completion of the moof 614.

DRM information can be stored in the moof 614 and delivered at an end of a transmission order for the out-of-order delivery mode 600. For low latency mode, DRM information for decryption of media data must be delivered before or right after each media data is delivered to reduce delay of transmission. Sample code included in a linear dispersion coding (LDC) message is shown below.

```
base_presentation_time_offset
coding_dependency_structure_flag
if (coding_dependency_structure_flag == 1) {
  period_of_intra_coded_sample
  for (i=0 ; i<N1;i++) {
    sample_composition_time_offset_sign
    sample_composition_time_offset_value
  }
}
```

The LDC message can provide decoding time and presentation time of a media sample to eliminate delay to wait for fragment metadata. The delay of out-of-order delivery only can be a duration of the MPU and a delay of out-of-order delivery with the LDC message can be set to zero.

Figure 7:
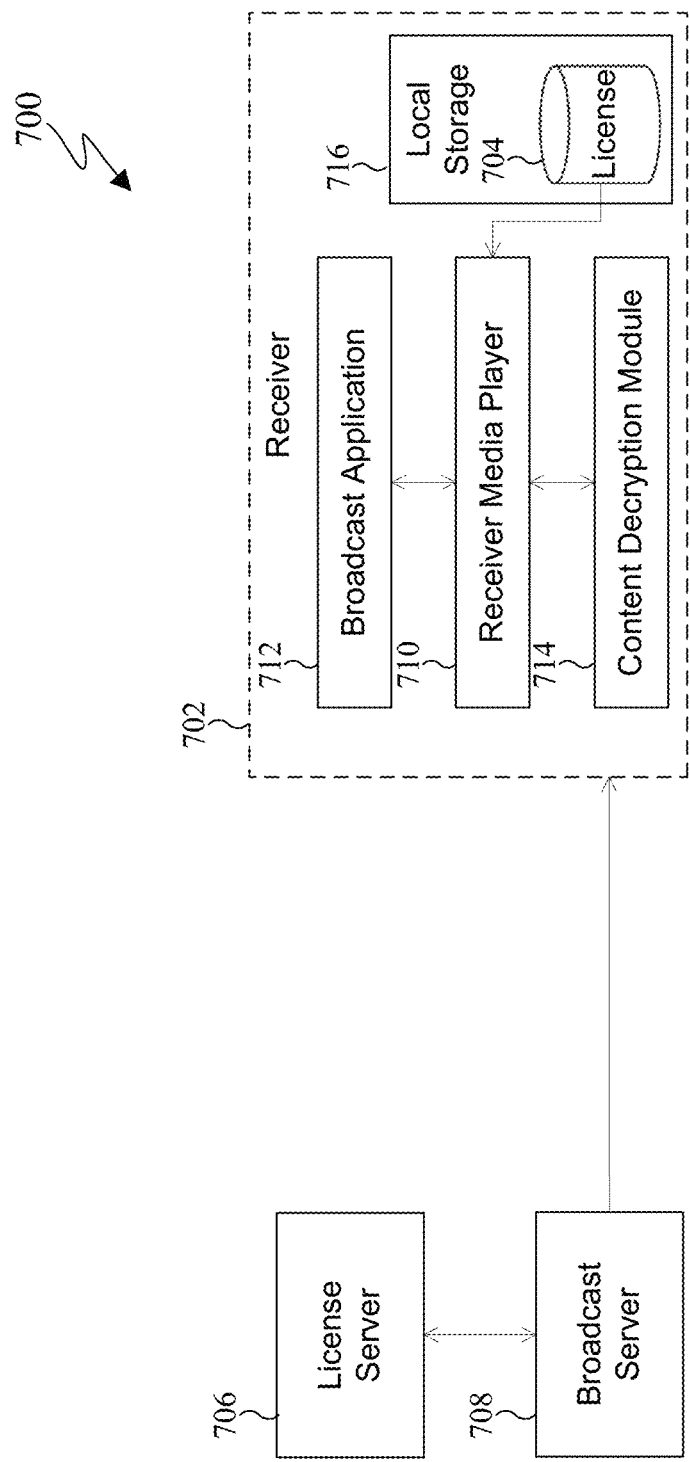
FIG. 7 illustrates an example DRM architecture for MMT according to this disclosure.

FIG. 7 illustrates an example DRM architecture 700 for MMT in accordance with this disclosure. The embodiment of the DRM architecture 700 illustrated in FIG. 7 is for illustration only. FIG. 7 does not limit the scope of this disclosure to any particular implementation of DRM for MMT.

As shown in FIG. 7, a conceptual model of DRM operation for MMT is depicted for when the receiver is not connected to the Internet. The receiver 702 can receive the license information for DRM operation from the license server 706 offline before receiving the service from the broadcast server 708. The broadcast server 708 can send service and signaling information for DRM operations to the receiver 702, such as MMT ATSC 3 signaling message containing security_properties_descriptors_LAURL and SI_descriptor.

The receiver 702 can include a receiver media player (RMP) 710, a broadcast application 712, and a content decryption module (CDM) 714. The RMP 710 of the receiver 702 can process signaling information and decode media components. When the media components are encrypted, the content decryption model is used for decryption of the content. For decryption of the media component, RMP 710 can acquire the license information by processing the information in MMT ATSC 3 signaling message and metadata boxes in MPU and retrieve a license 704 from the local storage 716. The broadcast server 708 can send a broadcast application together with the service, then the receiver 702 can execute the media content upon retrieval and validation for interactive services.

Contents protection in MMT relies on ISO/IEC23001-7 Common Encryption (CENC) framework for multiple DRM systems. Protection system specific and proprietary signaling information are delivered in two ways, including by the MMT signaling messages and carried in MPU in designated metadata boxes defined by ISO base media file format (BMFF).

When service is encrypted either the Service@protected attribute in SLT 532 is present and is set to true and ComponentInfo@componentProtectedFlag of at least one component listed in BundleDescriptionMMT must be set to true.

For delivery of DRM-related information to prepare the receiver 702 before the contents are delivered, some information is sent as MMT signaling messages in addition to the ISOBMFF defined metadata boxes of MPUs 532. The security_properties_descriptors_LAURL shown below is carried by the MMT ATSC 3.0 Signaling Message, mmt_atsc3_message( ), contains information for CENC and standardized license acquisition information. The signaling message could be represented by the entries in Table 1.

TABLE 1

| Signaling Message | | |
|---|---|---|
| Syntax | No. of Bits | Format |
| security_properties_descriptor_LAURL( ) { | | |
|   descriptor_tag | 16 | uimsbf |
|   descriptor_length | 16 | uimsbf |
|   number_of_assets | 8 | uimsbf |
|   for (i=0; i<number_of_assets; i++) { | | |
|     asset_id_length | 32 | uimsbf |
|     for (j=0; j<asset_id_length; j++) { | | |
|       asset_id_byte | 8 | uimsbf |
|     } | | |
|     scheme_code_present | 1 | bsibf |
|     default_KID_present | 1 | bsibf |
|     license_info_present | 1 | bsibf |
|     reserved | 5 | '00000' |
|     if (schme_code_present) { | | |
|       scheme_code | 4*8 | uimsbf |
|     } | | |
|     if (default_KID_present) { | | |
|       default_KID_length | 8 | uimsbf |
|       for (j=0; j<default_KID_length; j++){ | | |
|         default_KID_byte | 8 | uimsbf |
|       } | | |
|     } | | |
|     if (license_info_present) { | | |
|       number_of_license_info | 8 | uimsbf |
|       for (i=0; i<number_of_license_info; i++) { | | |
|         license_type | 8 | uimsbf |
|         LA_URL_length | 8 | uimsbf |
|         for (j=0; j<URL_length; j++) { | 8 | uimsbf |
|           LA_URL_byte | | |
|         } | | |
|       } | | |
|     } | | |
|     SI_descriptor( ) | var | Subclause 10.5.5 of 23008-1 |
|   } | | |
| } | | |

The descriptor_tag field represents a 16-bit unsigned integer field that can have a value 0x000C, identifying this descriptor as a security_properties_descriptor( ). The descriptor_length field represents a 16-bit unsigned integer field that can specify a length (in bytes) immediately following this field up to an end of this descriptor. The number_of_assets field represents an 8-bit unsigned integer field that can specify a number of DRM protected assets described by this descriptor. The asset_id_length represents a 32-bit unsigned integer field that can specify a length in bytes of a DRM protected asset id. The asset_id_byte field represents an 8-bit unsigned integer field that can contain a byte of a DRM protected asset id. The scheme_code_present flag represents a 1-bit Boolean flag that can indicate an element scheme_code is present when set to '1' and the flag can indicate that an element scheme_code is not present and an asset is protected by a CENC scheme when set to '0'. The default_KID_present flag represents a 1-bit Boolean flag that can indicate, when set to '1', that default KID for this DRM protected asset is present and, when set to '0', can indicate that no default KID for this DRM protected asset is present. The scheme_code field represents a 32-bit unsigned integer field that can specify a 4-character code for a protection scheme. The default_KID_length field represents an 8-bit unsigned integer field that can specify the length in bytes of the default KID for this DRM protected asset, where the value of this field can be set to 16. The default_KID_byte field represents an 8-bit unsigned integer field that can contain a byte of a default KID. The SI_descriptor( ) represents a descriptor that the syntax and sematic of this descriptor can be as defined in subclause 10.5.5 of ISO/IEC 23008-1. The license_info_present flag represents a 1-bit Boolean flag that shall indicate, when set to '1', that the URL information for ATSC receivers 702 to access the license server 706 directly. The number_of_license_info field represents an 8-bit unsigned integer field that can specify the number of license information signalled for the current asset. The license_type filed represents an 8-bit unsigned integer field that can specify a type of applicable license 704 as specified in the Table 2. The LA_URL_length represents an 8-bit unsigned integer field that can specify the length in bytes of the URL for license acquisition. The LA_URL_byte field represents an 8-bit unsigned integer field that can contain a byte of the URL for license acquisition. Code values for the license_type field can be represented by the following Table 2.

stored licenses 704. A player can simply compare these KID strings and determine what unique licenses 704 are necessary without interpreting license information specific to each DRM system.

A protection system specific header box (pssh) can be defined by each DRM system for use with their registered SystemID and is nominally stored in the moov 612 and additionally may be present in the moof 614. The information of the box can be copied to SI_descriptor of the security_properties_descriptors_LAURL carried in the MMT ATSC 3.0 signaling message by the broadcast server.

Information to access a server for the ATSC receive to acquire a license 704, the type of license 704 and the URL to access the license server 706 for license acquisition may be added to the security_properties_descriptors_LAURL carried in the MMT ATSC 3.0 Signaling Message by the broadcast server. More than one of following methods to acquire a valid license may be signaled. The license-1.0 represents a direct license 704 acquisition by ATSC 3.0 receivers 702 and the URI scheme is a valid endpoint for access. The groupLicense-1.0 can provide a path for a group-based license 704. The URI may need to be parsed specific to that DRM System by the ATSC 3.0 receiver 702 to access any local group licenses 704. The contentId-1.0 can provide information for the DRM specific content identifier used to generate the KIDs. The URI should be parsed to extract relevant information using REST based notation.

When an out-of-order delivery mode 600 is used, i.e. media data from mdat is delivered before other boxes are delivered, encryption metadata can be delivered as a signaling message so that the ATSC 3.0 receiver 702 can start decryption of media data immediately without any further delay. The receiver 702 uses the signaling message to acquire the information about the number of bytes of clear data and protected data of each subsamples of each sample,

TABLE 2

Code Values for license_type

| license_type | Meaning |
|---|---|
| 0 × 00 | ATSC Reserved |
| 0 × 01 | license-1.0, Direct license acquisition by ATSC 3.0 receivers and the URI scheme is a valid endpoint for access. |
| 0 × 02 | groupLicense-1.0, Provides a path for a group-based license. The URI may need to be parsed specific to that DRM System by the ATSC 3.0 receiver to access any local group licenses. |
| 0 × 03 | contentId-1.0, Provides information for the DRM specific content identifier used to generate the KIDs. The URI should be parsed to extract relevant information using REST based notation. |
| 0 × 04~0 × FF | Industry Reserved. See ATSC Code Point Registry |

The value of CENC can be used for the scheme_code field of the security_properties_descriptors_LAURL and the "urn:mpeg:cenc:2013" extension namespace is assumed. default_KID signaled in security_properties_descriptors_LAURL for each components may be sufficient for the receiver 702 to acquire a DRM license 704 or identify a previously acquired license 704 that can be used to decrypt a component.

As the default_KID is signaled by security_properties_descriptors_LAURL for each components, the default_KID allows a player to determine if a new license 704 needs to be acquired for each components by comparing their default_KIDs with each other, and with the default_KIDs of and the count of the encrypted blocks and the unencrypted blocks in the protection pattern for each sample groups are before it receives moof 614 or moov 612.

The low_delay_decryption_information_descriptor( ) is carried by the MMT ATSC 3.0 signaling message, a mmt_atsc3_message( ), containing encryption metadata for a specific sample. The descriptor uses an MPU_sequence_number field, a movie_fragment_sequence_number field and a sample_number field to identify a specific sample in which the information in the descriptor is applied.

This message supports two modes of operation, MPU-based operation mode and sample-based operation mode, which is distinguished by an operation_mode field. In the MPU-based operation mode, a descriptor can contain information about all samples in an MPU with a single descriptor. CencSampleEncryptionInformationGroupEntry sample group description structures for all sample groups defined in the MPU is provided by a single descriptor in this mode. In addition, a list of samples associated to each sample group and CencSampleAuxiliaryDataFormat for all of the samples are also provided by a single descriptor in an MPU-based operation mode. In the sample-based operation mode, one descriptor provides information about a single sample and a corresponding SampleEncryptionBox associated with this sample. In addition, the descriptor in this mode carries CencSampleEncryptionInformationGroupEntry sample group description structures for a sample group the sample this descriptor is associated with, whenever needed. If the sample group description structure for the same sample group has been already delivered, CencSampleEncryptionInformationGroupEntry sample group description structures can be skipped from being carried in the descriptor. The MMT ATSC 3.0 signaling message could be represented by the entries in Table 3.

TABLE 3

MMT ATSC 3.0 signaling message

| Syntax | No. of Bits | Format |
|---|---|---|
| low_delay_decryption_information_descriptor( ) { | | |
|   descriptor_tag | 16 | uimsbf |
|   descriptor_length | 16 | uimsbf |
|   MPU_sequence_number | 32 | uimsbf |
|   operation_mode | 3 | uimsbf |
|   sample_group_info_present | 1 | uimsbf |
|   reserved | 4 | 1111 |
|   if (operation mode == 1) { | | |
|     movie_fragment_sequence_number | 32 | uimsbf |
|     sample_number | 8 | uimsbf |
|     sample_group_number | 8 | uimsbf |
|   if (sample_group_info_present ==1) { | | |
|     size_of_seig_box | 32 | uimsbf |
|     for (k=0; k<bytes_of_seig_box; k++) { | | |
|       seig_box_byte | 8 | uimsbf |
|     } | | |
|     sizeofsencbox | 32 | uimsbf |
|   for (n=0; n<size_of_senc_info; n++) { | | |
|     senc_box_byte | 8 | uimsbf |
|   } | | |
| } | | |
| if (operation mode == 2) { | | |
|   number_of_movie_fragments | 8 | uimsbf |
|   for (i=0; i<number_of_movie_fragments; i++) | | |
| { | | |
|     movie+fragment_sequence_number | 32 | uimsbf |
|     number_of_sample_groups | 8 | uimsbf |
|     for (j=0; j<number_of_sample_groups; j++) | | |
| { | | |
|       size_of_seig_box | 32 | uimsbf |
|       for (k=0; k<bytes_of_seig_box; k++) { | | |
|         seig_box_byte | 8 | uimsbf |
|       } | | |
|       number_of_samples | 8 | uimsbf |
|       for (l=0; l<number_of_samples; l++) { | | |
|         sample_number | 8 | uimsbf |
|         size_of_aux_info | 32 | uimsbf |
|         for (m=0; m<size_of_aux_info; m++) | | |
| { | | |
|           aux+info_byte | 8 | uimsbf |
|         } | | |
|       } | | |
|     } | | |
|   } | | |
| } | | |
| } | | |

The descriptor_tag field represents a 16-bit unsigned integer field that can have the value 0x000E, identifying this descriptor as a low_delay_decryption_descriptor( ). The descriptor_length field represents a 16-bit unsigned integer field that can specify the length (in bytes) immediately following this field up to the end of this descriptor. The MPU_sequence_number filed represents a 32-bit unsigned integer field that can specify sequence number of the MPU this descriptor is applied to. The operation_mode field represents a 3-bit unsigned integer field that can specify the mode of operation this descriptor is used for as specified in Table 4.

TABLE 4

Code Values for operation_mode

| license_type | Meaning |
|---|---|
| 0 | AT SC Reserved |
| 1 | sample-based operation mode. The descriptor carries decryption information for the sample identified by the combination of MPU_sequence number, movie_fragment_sequence_number and sample_number. |
| 2 | MPU-based operation mode. The descriptor carries decryption information for all samples of the MPU identified by MPU_sequence_number |
| 3~7 | Industry Reserved. See ATSC Code Point Registry |

The sample_group_info_present flag represents a 1-bit Boolean flag that can indicate whether CencSampleEncryptionInformationGroupEntry is carried when set to '1' or not carried when set to '0'. The movie_fragment_sequence_number field represents a 32-bit unsigned integer field that can specify the sequence number of the movie fragment in which the information is applied. The sample_number field represents a 32-bit unsigned integer field that can specify a sequence number of a sample within a movie fragment in which the information is applied. The size_of_seig_box field represents a 32-bit unsigned integer field that can specify a size of a CencSampleEncryptionInformationGroupEntry box for a sample group. When the operation_mode is equal to '1', size_of_seig_box field can indicate a size of CencSampleEncryptionInformationGroupEntry box for a sample group the sample this descriptor is associated with. When the operation_mode is equal to '2', size_of_seig_box field can indicate a size of CencSampleEncryptionInformationGroupEntry box for a sample group whose group_description_index is equal to j. The seig_box_byte field represents an 8-bit unsigned integer field that can contain the kth byte of the CencSampleEncryptionInformationGroupEntry box for a sample group. When the operation_mode is equal to '1', seig_box_byte field can carry a kth byte of CencSampleEncryptionInformationGroupEntry box for a sample group the sample this descriptor is associated with. When the operation_mode is equal to '2', seig_box_byte field can carry a kth byte of CencSampleEncryptionInformationGroupEntry box for a sample group whose group_description_index is equal to j. The size_of_senc_box field represents a 32-bit unsigned integer field that can specify the size of SampleEncryptionBox for the sample this descriptor is associated with. The senc_box_byte field represents an 8-bit unsigned integer field that can contain an nth byte of a SampleEncryptionBox box for the sample this descriptor is associated with. The number_of_movie_fragments field represents an 8-bit unsigned integer field that can specify the number of movie fragments contained in an MPU this descriptor is applied to. The number_of_sample_groups field represents an 8-bit unsigned integer field that can specify a number of sample groups defined in the movie fragment information in the current loop is applied to. The number_of_samples represents an 8-bit unsigned integer field that can specify the number of samples belong to the sample group whose group_description_index is equal to j. The size_of_aux_info field represents a 32-bit unsigned integer field that can specify a size of CencSampleAuxiliaryDataFormat data structure applied to the sample currently being described. The aux_info_byte field represents an 8-bit unsigned integer field that can contain an mth byte of the CencSampleAuxiliaryDataFormat.

Although FIG. 7 illustrates an example DRM architecture 700 for MMT, various changes may be made to FIG. 7. For example, the number and placement of various components of the DRM architecture 700 can vary as needed or desired. In addition, the DRM architecture 700 may be used in any other suitable MMT process and is not limited to the specific processes described above.

Figure 8A:
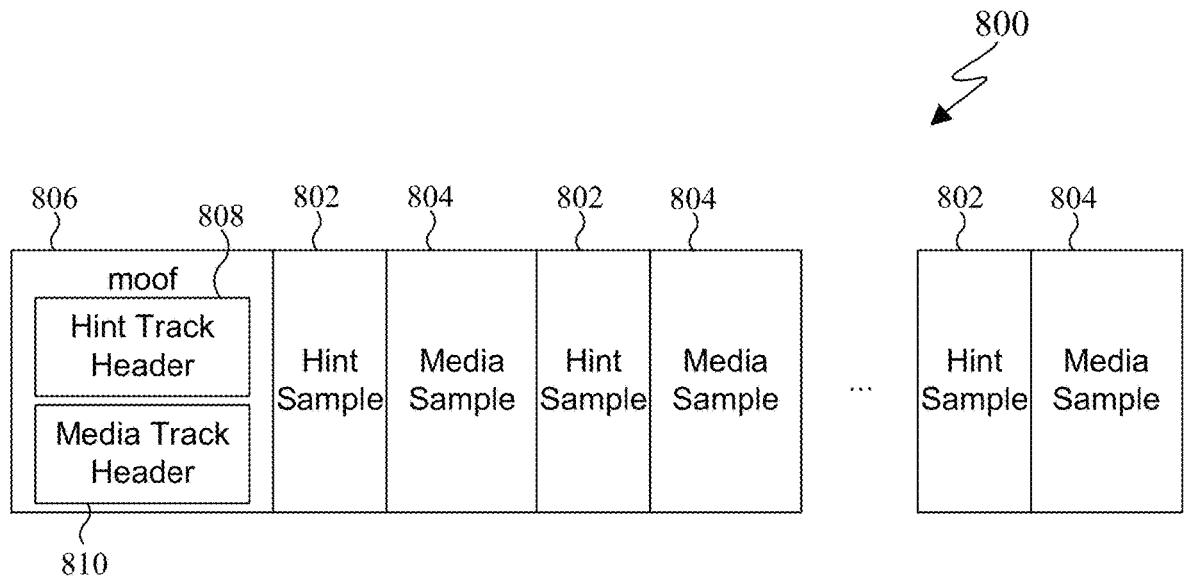
FIGS. 8A through 8C illustrate an example MPU with hint tracks according to this disclosure.
Figure 8B:
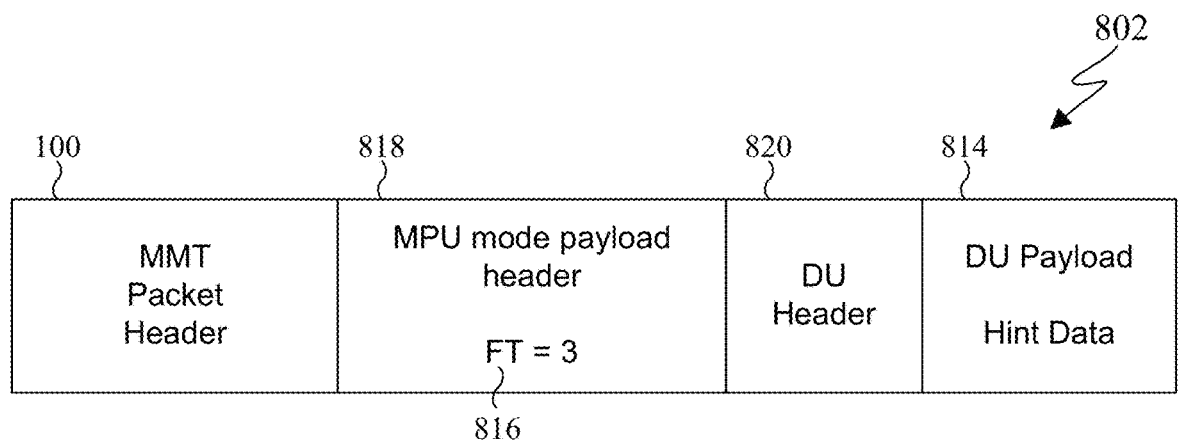
Figure 8C:
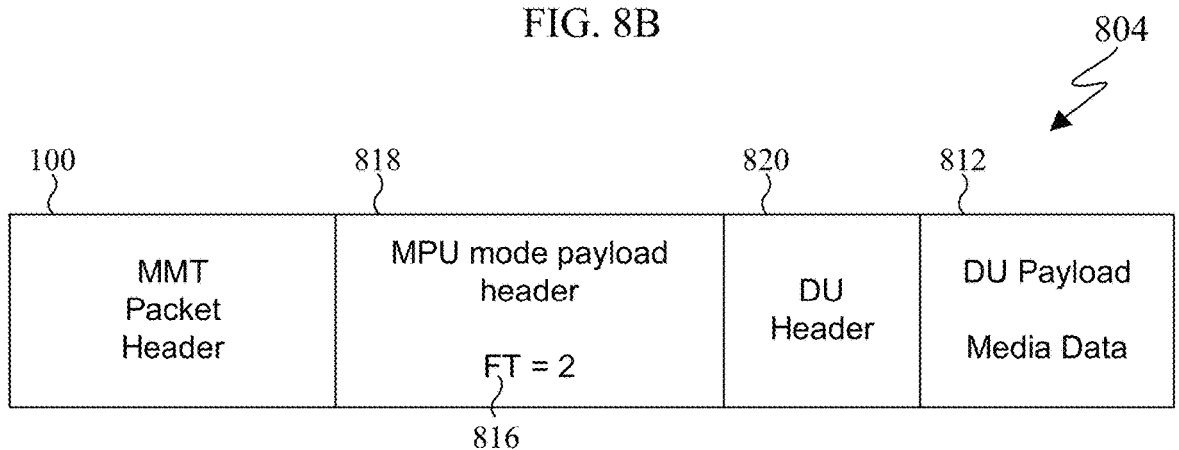

FIGS. 8A through 8C illustrate an example MPU 800 with hint tracks 802 in accordance with this disclosure. In particular, FIG. 8A illustrates an example MPU 800 with hint tracks 802, FIG. 8B illustrates an example hint track 802, and FIG. 8C illustrates an example media track 804. The embodiments of the example MPU 800 illustrated in FIGS. 8A through 8C are for illustration only. FIGS. 8A through 8C do not limit the scope of this disclosure to any particular implementation of an MPU. The MPU 800 can correspond to the MPU shown in FIG. 5.

As shown in FIGS. 8A through 8C, an MPU 800 can include at least one hint track 802 before respective media tracks 804, the media tracks 804, and a moof 806 inducing a hint track header 808, and a media track header 810. A hint sample 802 can be created for each media sample 804. The hint sample 802 can carry decryption information, normally stored in moof 806, corresponding to the respective media sample. In this way, the moof information for decrypting a respective media sample can be generated and transmitted prior to completion of the entire moof 806. The moof 806 can correspond to the moof 614 shown in FIG. 6

In case an out of order delivery mode 600 is used, i.e. media data from 'mdat' box is delivered before other boxes are delivered, metadata required for decryption of that media data is delivered as hint samples 802 to reduce a number of signaling messages to be processed. The sender copies information for decryption of media samples 804 to LowDelayProcessingInfo for each hint sample 802 from the SampleEncryptionBox of corresponding media samples 804.

The semantics for each fields of LowDelayProcessingInfo can be identical to the fields of a SampleEncryptionBox with an identical name. As the LowDelayProcessingInfo may only contain information for a single sample, a field about a number of samples of the SampleEncryptionBox is not copied.

The sender may deliver such LowDelayProcessingInfo together with media samples 804. The receiver 702 may use such LowDelayProcessingInfo instead of SampleEncryptionBox for decryption of a media sample 804 without waiting for moof 806 or moov 612 containing SampleEncryptionBox to be delivered. Note that a complete SampleEncryptionBox corresponding to the media samples 804 of a movie fragment is not replaced by LowDelayProcessingInfo and delivered as a part of moof 806 regardless of use of LowDelayProcessingInfo.

Sample entry type of 'mtha' is used for MMT hint tracks 802 in ATSC 3.0. This sample entry type includes indication of version and reserved bits for introduction of new flags for future extension. A sample syntax for the hint track 802 can be represented as follows.

```
aligned(8) class MMTHintATSC3SampleEntry( ) extends SampleEntry('mtha') {
    unsigned int(16) hinttrackversion = 1;
    unsigned int(16) highestcompatibleversion = 1;
    unsigned int(1) has_mfus_flag;
    unsigned int(1) is_timed;
    unsigned int(1) decryption_info_flag;
    unsigned int(13) reserved;
}
```

Where the hinttrackversion field can specify a version of this hint track. Current version is 1. The highestcompatibleversion field can specify an oldest version with which a hint track is backward-compatible. The has_mfus_flag field can represent a flag indicating whether MPUs 800 are fragmented into MFUs. If this flag is set to FALSE, the hint track 802 applies to the complete MPU 800, i.e. each track fragment will have a single sample. Otherwise, each hint sample 802 applies to a corresponding MFU. The is timed field can indicate whether the media data hinted by this track is timed data or non-timed data. The low_delay_decryption_info_flag field can indicate whether the low delay decryption information of the media data hinted by this track is included in the hint samples. If the value of this field is set to '1', then the information is included in the samples. If the value of this field is set to '0', then the information is not included in the samples.

A Sample structure of an MMT hint track for ATSC 3.0 can vary by a value of hinttrackversion field set by the sample entry box. According to the value of hinttrackversion field, values of the different sets of flags set by the sample entry box are evaluated and additional data structure are included in the end of the hint sample. The hinttrackversion field can be represented by the follow syntax.

```
aligned(8) class MMTHSampleATSC3(hinttrackversion)
{
    unsigned int(32) sequence_number;
    if (is_timed) {
    signed int(8) trackrefindex;
        unsigned int(32) movie_fragment_sequence_number
        unsigned int(32) samplenumber;
        unsigned int(8) priority;
        unsigned int(8) dependency_counter;
        unsigned int(32) offset;
        unsigned int(32) length;
    } else {
        unsigned int(16) item_ID;
    }
    if(hinttrackversion == 1){
      if(low_delay_decryption_info_flag){
        unsigned int(24) flags;
        LowDelayDecryptionInfo( )
      }
    }
}
```

Where the hinttrackversion field can contain a value set by the sample entry this sample belongs to. The sequence_number field represents an integer number that can indicate a sequencing order of this MFU within the MPU 800. Discontinuity of sequence numbers in an MPU 800 is allowed to indicate that certain MFUs (whose sequence number was not in the sequence) were not processed after packetization of MPU 800. Examples of MFU processing are delivery and caching by underlying network entity. The movie_fragment_sequence_number field represents a sequence number of the movie fragment to which the media data of this MFU belongs (see ISO/IEC 14496-12:2015, 8.8.5). The movie_fragment_sequence_number field in an MPU 800 can start by "1" for the first movie fragment of the MPU 800 and can be incremented by "1" for every succeeding movie fragment in that MPU 800. The trackrefindex field represents an ID of a media track from which MFU data is extracted. The samplenumber field represents a number of the sample from which this MFU is extracted. The Sample number n points to the n-th sample from accumulated samples of the current movie fragment. The sample number of the first sample in the movie fragment is set to "1" (see ISO/IEC 14496-12:2015, 8.8.8). The priority field can indicate a priority of an MFU relative to other MFUs within an MPU 800. The dependency_counter field can indicate a number of MFUs whose decoding is dependent on this MFU. The value of this field is equal to a number of subsequent MFUs in an order of sequence_number field that may not be correctly decoded without this MFU. For example, if the value of this field is equal to n, then n subsequent MFUs may not be correctly decoded without this MFU. The offset field represents an offset of media data contained in an MFU. The offset base is a beginning of a containing "mdat" box. The MFU can be placed at a position that the offset indicates. The length field represents a length of data corresponding to an MFU in bytes. The item_ID field represents, for non-timed media data, an ID of an item that is contained in this MFU. The hinttrackversion field can be a version of a hint track indicated by a sample entry of a track. The flags field can carry a same value of a flags field of SampleEncryptionBox this sample belongs to. The low_delay_decryption_info_flag field can contain a value set by a sample entry this sample belongs to.

An example syntax for low delay decryption info is as follows.

```
aligned(8) class LowDelayDecryptionInfo( )
{
  unsigned int(Per_Sample_IV_Size*8) InitializationVector;
  if (flags & 0x000002)
  {
    unsigned int(16) subsample_count;
    {
      unsigned int(16) BytesOfClearData;
      unsigned int(32) BytesOfProtectedData;
    }[ subsample_count ]
  }
}
```

Where the InitializationVector field can be the same as semantics of the InitializationVector field of SampleEncryptionBox in ISO/IEC 23001-7. The InitializationVector field can carry a same value of the InitializationVector field of SampleEncryptionBox corresponding the same sample. The subsample_count value can be the same as a semantics of subsample_count field of SampleEncryptionBox in ISO/IEC 23001-7. The subsample_count field can carry a same value of the subsample_count field of SampleEncryptionBox corresponding the same sample. The BytesOfClearData field can be the same as semantics of BytesOfClearData field of SampleEncryptionBox in ISO/IEC 23001-7. The BytesOfClearData field can carry a same value of the BytesOfClearData field of SampleEncryptionBox corresponding the same sample. The BytesOfProtectedData field can be the same as semantics of BytesOfClearData field of SampleEncryptionBox in ISO/IEC 23001-7. The BytesOfProtectedData field can carry a same value of the BytesOfProtectedData field of SampleEncryptionBox corresponding the same sample.

As hint samples 802 may not be independent media but an integral part of an MPU 800, the hint samples 802 need to be delivered together with the media data they are describing, which means they need to be delivered by the MMTP packets whose value of the packet_id field is the same with the MMTP packet delivering media data they are describing.

An MPU 800 is delivered with the MMTP packets of whose packet_id field of MMTP packet header is same. When an MPU 800 is delivered, the MPU Fragment Type, FT, field of the MMTP payload header is used to distinguish the types of data from an MPU 800. To differentiate the packets containing hint sample data from the packets containing media data new fragment type value is defined for hint sample as shown in Table 5.

TABLE 5

Data type and definition of data unit

| FT | Description | Content |
|---|---|---|
| 0 | MPU metadata | contains the ftyp, mmpu, moov, and meta boxes, as well as any other boxes that appear in between. |
| 1 | Movie fragment metadata | contains the moof box and the mdat box, excluding all media data inside the mdat box but including any chunks of auxiliary sample information. |
| 2 | MFU | contains a sample or subsample of timed media data or an item of non-timed media data. |
| 3 | MMT hint sample for ATSC3 | contains a sample data of MMT hint sample for ATSC 3 type describing media data delivered by the MMT packets with same packet id |
| 4~15 | Reserved for private use | reserved |

The DU header for timed media is used for the hint samples. The value of the fields of the DU header for hint sample are set to the same value of the DU header for media sample which is described by that hint sample except the offset field.

An example structure of a fragment of an MPU 800 for low latency out of mode delivery is shown in FIG. 8A. The MPU 800 contains two tracks, a media track for media data and a hint track for hint data containing hint samples 802 about that media samples 804. For low latency delivery and processing, a location of samples is arranged in a way that media sample 804 is preceded directly by corresponding hint sample. Composition time stamp of a hint sample 802 is set to the same value of corresponding media sample.

An example structure of the MMTP packets delivering an MPU 800 including MMT hint track 802 for ATSC 3.0 is shown in FIGS. 8B and 8C. Media data 812 and hint data 814 are delivered by the separate MMTP packets. The value of packet_id field of MMTP packets containing both media data 812 and hint data are set to the same value as they are parts of same MPU 800. MMTP packets containing media data 812 with a value of the FT field 816 of payload header 818 can be set to 2 and MMTP packets containing hint data 814 the value of the FT field 816 of payload header 818 can be set to 3. Both media data 812 and hint data 814 can use DU header 820 for a timed MPU 800. The value of the fields of DU header 820 for hint data 814 can be exactly the same as a value of the same fields for video data it is describing except the offset field. To reduce processing delay by the clients, the MMTP packet containing hint data 814 directly precede the packets containing media data 812 which is described by that hint sample 814.

Although FIGS. 8A through 8C illustrate a MPU 800 with hint tracks 802, various changes may be made to FIGS. 8A through 8C. For example, the number and placement of various components of the MPU 800, the hint track 802, and the media track 804 can vary as needed or desired. In addition, the MPU 800, the hint track 802, and the media track 804 may be used in any other suitable MMT process and is not limited to the specific processes described above.

An example operation of the receiver illustrating processing of encrypted content with the license 704 locally on a receiver that is unconnected to the internet is follows. A user selects a Service with encrypted audio and video. If a Broadcast Application is also present in the definition of the Service then the Receiver receives and executes it when the package containing it has been retrieved and validated.

Figure 9A:
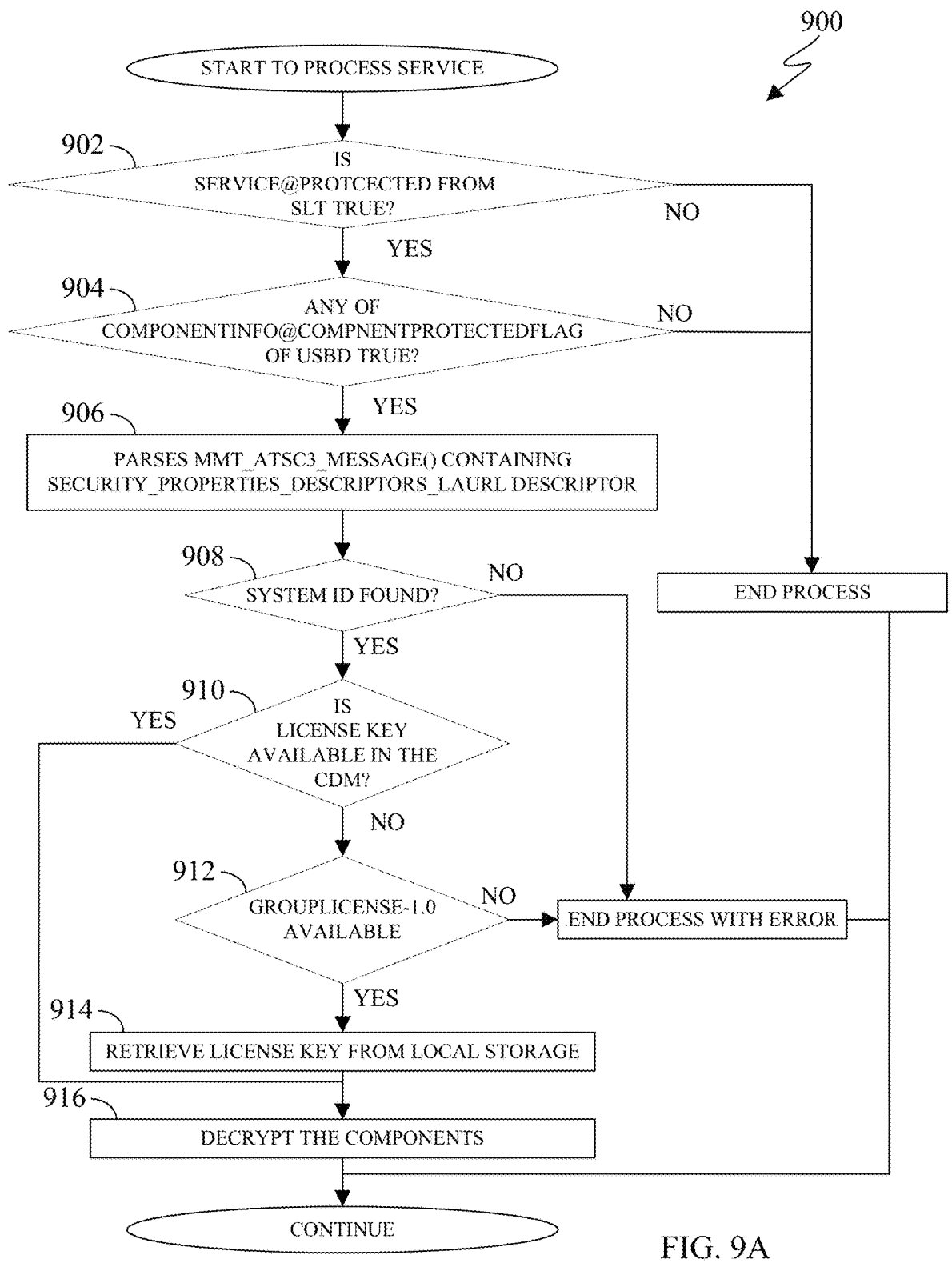
FIGS. 9A and 9B illustrate example methods for operating an MMT DRM receiver that may not be connected to the internet according to this disclosure.
Figure 9B:
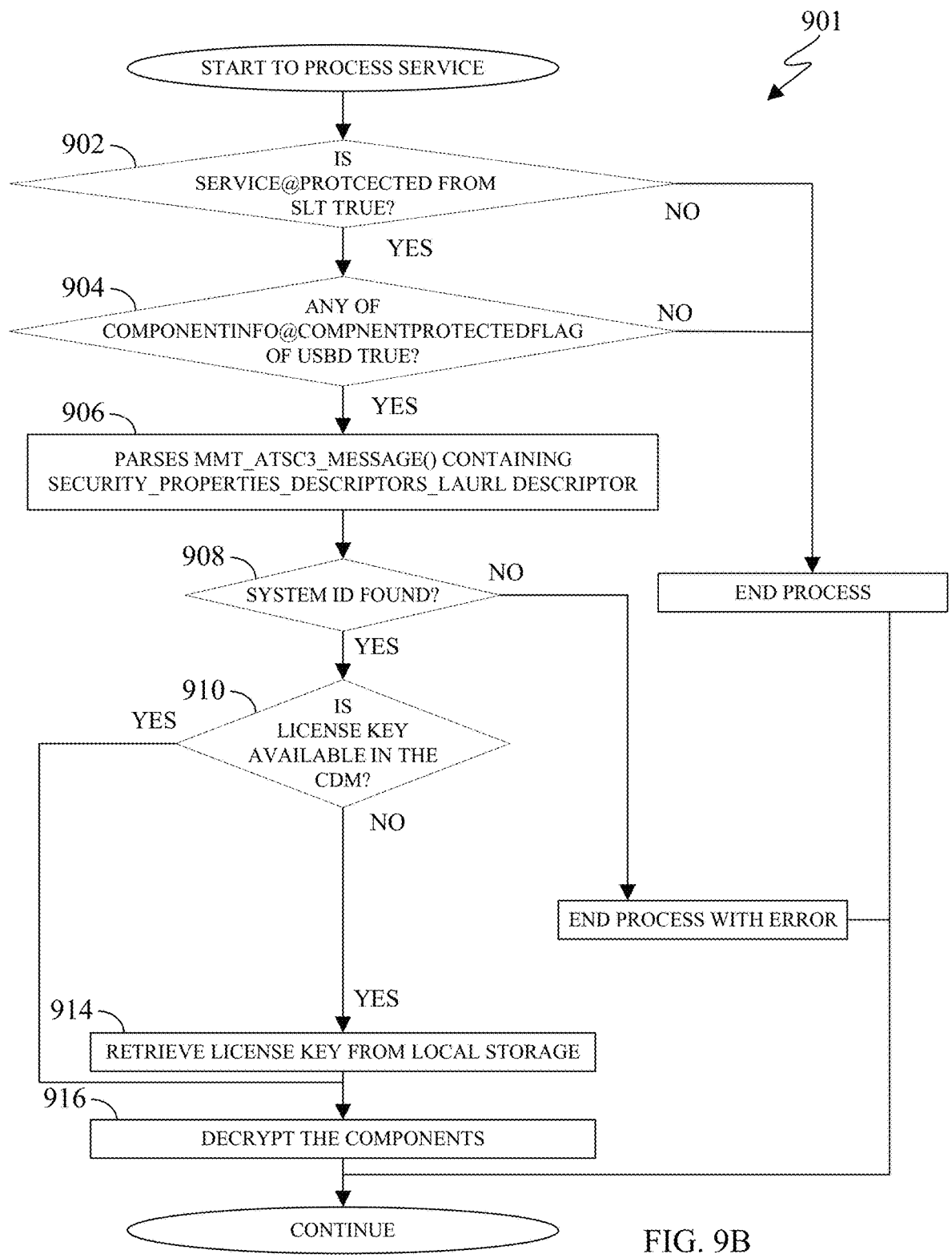

FIGS. 9A and 9B illustrate example methods 900, 901 for operating an MMT DRM receiver 702 that may not be connected to the internet according to this disclosure. For ease of explanation, the methods 900, 901 of FIGS. 9A and 9B are described as being performed using the receiver 702 of FIG. 7. However, the methods 900, 901 may be used with any other suitable system and any other suitable receiver.

As shown in FIGS. 9A and 9B, the receiver 702 can determine whether a value of service@protected from the SLT 532 is set to true at step 902. The RMP 710 can set the rmpPlaybackStateChange to −1. If the value of service@protected from the SLT is not set to true, the method 900 ends.

The receiver 702 can determine whether any value of Componentinfo@componentProtectedFlag of USBD are set to true at step 904. When the Service@protected attribute in SLT 532 is present and is set to true and ComponentInfo@componentProtectedFlag of at least one of components listed in BundleDescriptionMMT is set to true, then the RMP 710 can discover the service is encrypted and can set the rmpPlaybackStateChange to 3.

The receiver 702 can parse an mmt_atsc3_message( ) containing security_properties_descriptors_LAURL descriptor at step 906. The RMP 710 can parse the MMT ATSC 3.0 signaling message, mmt_atsc3_message( ), containing the security_properties_descriptors_LAURL to discover whether a DRM system ID is listed that the RMP 710 supports.

The receiver 702 can determine whether a system ID is found at step 908. For each component, the ID of the DRM system can be known from the value of the system_id field of the SI_descriptor whose asset_id is matched with the value of the ComponentInfo@componentId attribute from the BundleDescriptionMMT or the MMT Asset ID from the MP table. If one is found, so processing continues. The RMP 710 can initiate the relevant CDM 714 for the given DRM System ID. The RMP 710 initiates the relevant CDM 714 for the given DRM System ID. If none of the values of componentinfo@componentprotectedflag of the USBD are set to true, the method 900 ends with an error.

The receiver 702 can determine whether a license key is available in the CDM 714 at step 910. The CDM 714 in the receiver 702 associated with the DRM System ID can check to see whether the license key required to decrypt the video and audio is already in storage. In this example, the CDM 714 can determine that no pre-existing license 704 for this content is available and prepares a license request for the key. The CDM 714 notifies the RMP 710 that a key is required for the KID1 and KID2. If a group license 704 is available in the CDM 714, the method 900 skips to step 914.

As shown in FIG. 9A, the receiver 702 can determine whether a groupLicense-1.0 is available at step 912. The RMP 710 can detect that a type of license 704 equal to "groupLicense-1.0" is available from the license_type field of the security_properties_descriptors_LAURL contained in MMT ATSC 3.0 signaling message and can recognize that a license 704 can be fetched locally by the receiver 702. When the groupLicense-1.0 is not available, the method 900 ends with an error.

As shown in FIG. 9B, the broadcast server and the receiver 702 can assume that the groupLicense-1.0 type of license 704 is used. Then the server can signal whether at least one of the components of service is encrypted through Service@protected attribute in SLT 532 and ComponentInfo@componentProtectedFlag. The broadcast server also can signal an SI_descriptor in asset descriptor loop for DRM information. The receiver 702 can identify a DRM system ID directly from SI_descriptor in MP table and use the identified DRM system ID to retrieve license information from license 704 in the local storage 716. In this embodiment, step 912 is skipped or omitted.

The receiver 702 can retrieve a license key or license 704 from local storage 716 at step 914. The RMP 710 can extract a URL value of the license server 706 from the LA_URL_byte fields of the security_properties_descriptors_LAURL contained in MMT ATSC 3.0 signaling message. The RMP 710 can locate the license 704 locally. This process does not involve interaction with the user. The RMP 710 can issue the license 704 to the CDM 714 for each of the KIDs.

The receiver 702 can decrypt the component at step 916. The CDM 714 can receive the license 704, saves the license 704, and use the license 704 to derive a key needed to decrypt the content. The receiver can use the key to decrypt the component.

Although FIGS. 9A and 9B illustrate examples of method 900, 901 for operating an MMT DRM receiver 702 that may not be connected to the internet, various changes may be made to FIGS. 9A and 9B. For example, while shown as a series of steps, various steps in FIGS. 9A and 9B may overlap, occur in parallel, or occur any number of times.

Figure 10:
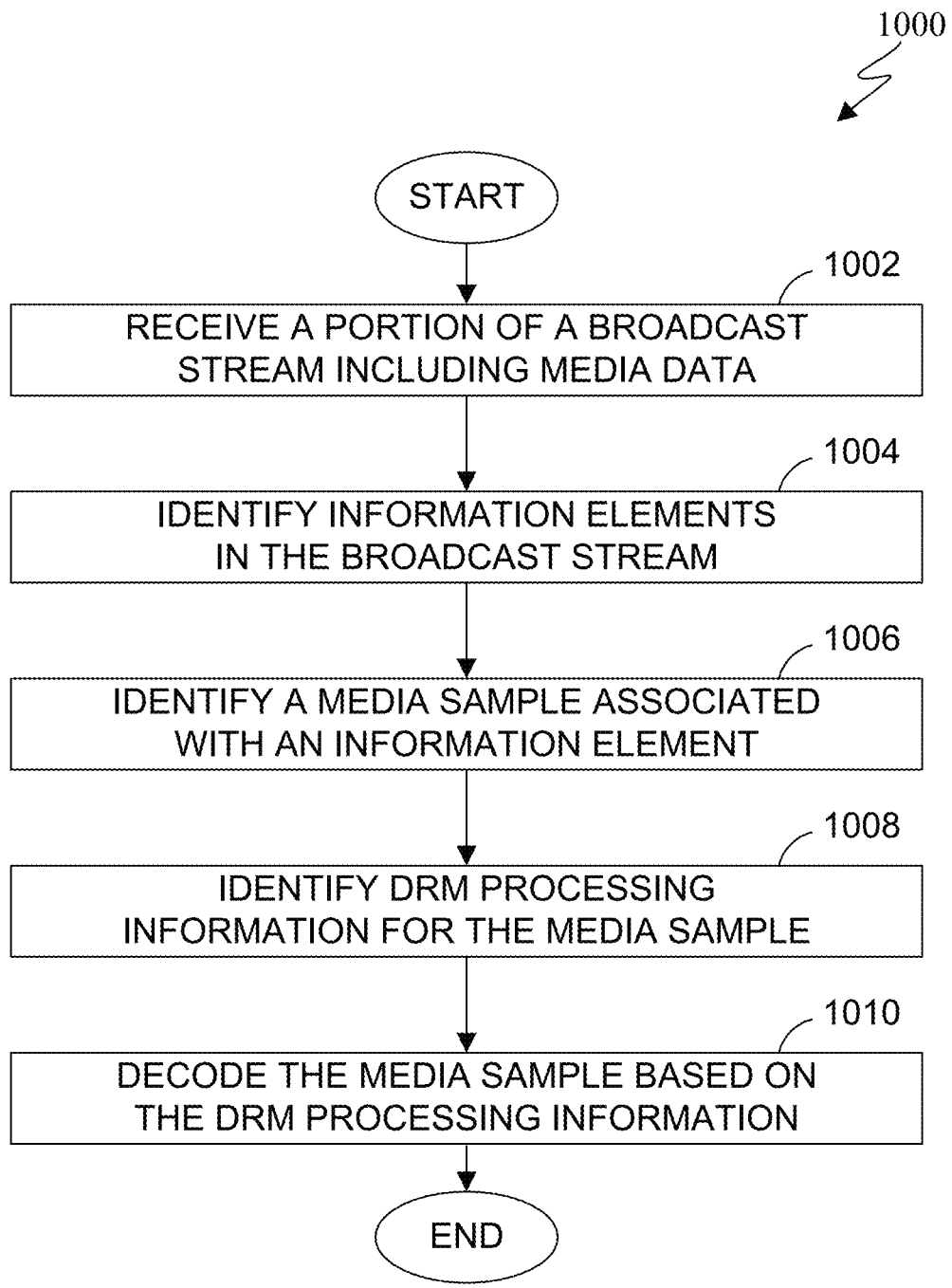
FIG. 10 illustrates an example method for MMT based DRM operation for ATSC 3.0 according to this disclosure.

FIG. 10 illustrates an example method 1000 for MMT based DRM operation for ATSC 3.0 according to this disclosure. For ease of explanation, the method 1000 of FIG. 10 is described as being performed using the receiver 702 of FIG. 7. However, the method 1000 may be used with any other suitable system and any other suitable receiver.

As shown in FIG. 10, the receiver 702 can receive a portion of a broadcast stream including media data comprising media sample at step 1002. The portion of the broadcast stream can include receiving a signaling message, a hint track, and one or more media samples corresponding to the media data.

The receiver 702 can identify one or more information elements in the broadcast stream at step 1004. The information element can be included in a signaling message or a time-interleaved sequence of hint tracks and media tracks. For the time-interleaved sequence, each hint track carries decryption information of a following media track. The information element is associated with a respective one media sample of the media data.

The signaling message can be an mmt_atsc3_message field. The signaling message include a decryption information descriptor, such as a low_delay_decrytpion_information_descriptor field. The information descriptor can include an indication of a mode of operation, decryption information, and identifying information. The mode of operation can be an operation_mode field. The mode of operation can indication of a sample-based operation mode or an MPU-based operation mode. The identification information can identify a sample of a media fragment when in the sample-based operation mode. The media fragment can be identified by a combination of the MPU_sequence_number field, the movie_fragment_sequence_number field, and the sample_number field. The identification information can identify an MPU 800 when in the MPU-based operation mode. The MPU 800 can be identified by the MPU_sequence_number field.

The receiver 702 can identify a media sample of the media data at step 1006. One or more media samples of the media data associated with the DRM processing information can be identified. The one or more media samples can be received after the information element is received.

For the sample-based operation mode, a sample of a media fragment can be identified based on the identifying information. For the MPU-based operation mode, samples of an MPU 800 can be identified based on the identifying information.

The receiver 702 can identify DRM processing information for the one media sample based on the information element at step 1008. When a signaling message indicates an out-of-order delivery mode 600 and the moof 806 is received after the media data, the moof 806 received is associated with the media data received prior to the moof 806. When a hint track indicates an out-of-order delivery mode 600, the decryption information for each media sample is received in a hint track prior to the media sample. However, the decryption information is divided into an amount of hint tracks equal to the amount of media samples.

The receiver 702 can decode the media sample at step 1010. The receiver 702 can decode the media sample based on the DRM processing information. When a signaling message is used, the moof 806 is received after the media sample and the decryption information in the moof 806 is used to decrypt the media sample. When a hint track is used, the decryption information for decoding a media sample is received in a hint sample associated with the media sample.

In the sample-based operation mode, the identified sample of the media fragment can be decoded based on the decryption information. In the MPU-based operation mode, the identified samples of the MPU 800 can be decoded based on the decryption information.

Although FIG. 10 illustrates one example of a method 1000 for MMT based DRM operation for ATSC 3.0, various changes may be made to FIG. 10. For example, while shown as a series of steps, various steps in FIG. 10 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A decoding device comprising:
a communication interface configured to receive at least a portion of a broadcast stream including media data comprising media samples; and
a processor operably coupled to the communication interface, the processor configured to:
identify information elements containing digital rights management (DRM) processing information in the broadcast stream, wherein each information element is associated with a respective one media sample of the media data, and wherein the information elements are included in signaling messages received prior to the media samples or in hint samples of a time-interleaved sequence of the hint samples and the media samples included in a media processing unit (MPU), wherein each of the hint samples in the MPU directly precedes its respective one media sample, wherein the hint samples are delivered in hint data packets each having a fragment type field, wherein the fragment type field includes a value that identifies the hint data packet as a hint data packet type to distinguish the hint data packet from a separate media data packet and indicates the hint data packet includes hint sample data corresponding to media sample data delivered by the separate media data packet, and wherein the separate media data packet has a same packet ID as the hint data packet; and
for each information element:
identify the one media sample that is associated with the information element;
identify, based on the information element, the DRM processing information for the one media sample; and
decode the one media sample using the DRM processing information.

2. The decoding device of claim 1, wherein, to identify the information elements in the broadcast stream, the processor is further configured to identify the hint samples in the time-interleaved sequence of the hint samples and the media samples.

3. The decoding device of claim 2, wherein each of the hint samples carries decryption information for its respective one media sample.

4. The decoding device of claim 1, wherein, to identify the information elements in the broadcast stream, the processor is further configured to identify the signaling messages received prior to the media samples.

5. The decoding device of claim 4, wherein each signaling message includes an indication of a mode of operation, decryption information, and identifying information of its respective one media sample.

6. The decoding device of claim 5, wherein:
the mode of operation indicates a sample-based operation mode,
to identify the one media sample, the processor is further configured to identify a sample of a media fragment based on the identifying information, and
to decode the one media sample, the processor is further configured to decode the identified sample of the media fragment based on the decryption information.

7. The decoding device of claim 4, wherein:
each signaling message further includes a security properties descriptor, and
the processor is further configured to:
access a license server based on information in the security properties descriptor,
obtain a license from the license server, and
decrypt the media samples using the license.

8. The decoding device of claim 7, wherein the security properties descriptor includes:
information that indicates a signaling message contains URL information of the license server,
a number of licenses for the media samples, and
for each license for a respective media sample, a type of the license, a length of a URL, and the URL.

9. A method for a decoding device, comprising:
receiving, using a communication interface of the decoding device, at least a portion of a broadcast stream including media data comprising media samples;
identifying, using a processor of the decoding device operably coupled to the communication interface, information elements containing digital rights management (DRM) processing information in the broadcast stream, wherein each information element is associated with a respective one media sample of the media data, and wherein the information elements are included in signaling messages received prior to the media samples or in hint samples of a time-interleaved sequence of the hint samples and the media samples included in a media processing unit (MPU), wherein each of the hint samples directly precedes its respective one media sample, wherein the hint samples are delivered in hint data packets each having a fragment type field, wherein the fragment type field includes a value that identifies the hint data packet as a hint data packet type to distinguish the hint data packet from a separate media data packet and indicates the hint data packet includes hint sample data corresponding to media sample data delivered by the separate media data packet, and wherein the separate media data packet has a same packet ID as the hint data packet; and
for each information element:
identifying, using the processor, the one media sample that is associated with the information element;
identifying, based on the information element, the DRM processing information for the one media sample; and
decoding, using the processor, the one media sample using the DRM processing information.

10. The method of claim 9, wherein identifying the information elements in the broadcast stream comprises identifying the hint samples in the time-interleaved sequence of the hint samples and the media samples.

11. The method of claim 10, wherein each of the hint samples carries decryption information for its respective one media sample.

12. The method of claim 9, wherein, to identify the information elements in the broadcast stream, the processor is further configured to identify the signaling messages received prior to the media samples.

13. The method of claim 12, wherein each signaling message includes an indication of a mode of operation, decryption information, and identifying information of its respective one media sample.

14. The method of claim 13, wherein:
the mode of operation indicates a sample-based operation mode,
identifying the one media sample comprises identifying a sample of a media fragment based on the identifying information, and
decoding the one media sample comprises decoding the identified sample of the media fragment based on the decryption information.

15. The method of claim 12, wherein:
each signaling message further includes a security properties descriptor, and
the method further comprises:
accessing a license server based on information in the security properties descriptor,
obtaining a license from the license server, and
decrypting the media samples using the license.

16. The method of claim 15, wherein the security properties descriptor includes:
information that indicates a signaling message contains URL information of the license server,
a number of licenses for the media samples, and
for each license for a respective media sample, a type of the license, a length of a URL, and the URL.

* * * * *